(12) United States Patent
Stockard et al.

(10) Patent No.: US 10,060,454 B2
(45) Date of Patent: Aug. 28, 2018

(54) HIGH SPEED JET BLOCKER WITH READILY REPLACEABLE BLOCKING MATERIAL

(71) Applicant: John Bean Technologies Corporation, Chicago, IL (US)

(72) Inventors: Richard D. Stockard, Kirkland, WA (US); Norman A. Rudy, Burlington, WA (US); John R. Strong, Bellevue, WA (US); Ronald A. Shutter, Renton, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 15/470,380

(22) Filed: Mar. 27, 2017

(65) Prior Publication Data

US 2017/0198732 A1    Jul. 13, 2017

Related U.S. Application Data

(62) Division of application No. 14/590,903, filed on Jan. 6, 2015, now Pat. No. 9,604,230.

(Continued)

(51) Int. Cl.
*F16K 29/00* (2006.01)
*F15D 1/08* (2006.01)
(Continued)

(52) U.S. Cl.
CPC .................. *F15D 1/08* (2013.01); *F16K 1/14* (2013.01); *F16K 1/34* (2013.01); *Y10T 137/6253* (2015.04)

(58) Field of Classification Search
CPC ......... B05B 1/3026; B05B 1/26; B26F 3/004; B26F 2003/006; B26F 3/00;
(Continued)

(56) References Cited

U.S. PATENT DOCUMENTS 1,409,127 A * 3/1922 Wasem ..................... F16K 1/14
                                                            251/86
3,725,990 A    4/1973 Petersen et al.
(Continued)

FOREIGN PATENT DOCUMENTS

AU    2009201565 A1    11/2009
DE    37 01 673 A1     8/1988
(Continued)

OTHER PUBLICATIONS

International Search Report and Written Opinion dated Apr. 8, 2015, issued in corresponding International Application No. PCT/US2015/010339, filed Jan. 6, 2015, 10 pages.
(Continued)

*Primary Examiner* — Umashankar Venkatesan
(74) *Attorney, Agent, or Firm* — Christensen O'Connor Johnson Kindness PLLC

(57) ABSTRACT

A blocker apparatus (20) for blocking a stream (22) of high-pressure fluid includes a blocking member in the form of a sphere or ball (30), or a rod (160) receivable within a partially surrounding seat (34/162) at the forward end of a seat carrier (40) to rotate in the seat. The seat carrier (40) is extended and retracted by an actuator (32) to place the blocking member within the path of the stream (22) and/or remove the blocking member from the path of the high-pressure stream. The blocking member is replaced by simply lifting the blocking member (30/160) off of the seat (34/162) and lowering a new blocking member into the seat.

20 Claims, 5 Drawing Sheets

Related U.S. Application Data

(60) Provisional application No. 61/924,631, filed on Jan. 7, 2014.

(51) Int. Cl.
  *F16K 1/14* (2006.01)
  *F16K 1/34* (2006.01)

(58) Field of Classification Search
  CPC .......... F16K 31/1221; F16K 1/34; F16K 1/14; F16K 1/122; F15D 1/08
  USPC ...................... 251/215; 83/153, 177; 137/331
  See application file for complete search history.

(56) References Cited

U.S. PATENT DOCUMENTS

| | | | |
|---|---|---|---|
| 4,252,040 A * | 2/1981 | Kiefer | B23D 47/042 83/153 |
| 4,532,949 A | 8/1985 | Frank | |
| 5,193,576 A | 3/1993 | Mosby | |
| 5,927,320 A | 7/1999 | Pfarr et al. | |
| 5,931,178 A | 8/1999 | Pfarr et al. | |
| 5,983,763 A | 11/1999 | Morris | |
| 7,624,929 B2 * | 12/2009 | Sohn | F16K 1/14 236/100 |
| 8,672,289 B2 * | 3/2014 | Fenwick | F16K 1/14 137/410 |
| 2015/0013517 A1 | 1/2015 | Neubauer | |

FOREIGN PATENT DOCUMENTS

| | | |
|---|---|---|
| DE | 10 2011 119 556 A1 | 3/2012 |
| WO | 2013/128004 A1 | 9/2013 |
| WO | 2013/172917 A1 | 11/2013 |

OTHER PUBLICATIONS

Written Opinion of the International Preliminary Examining Authority dated Jan. 19, 2016, issued in corresponding International Application No. PCT/US2015/010339, filed Jan. 6, 2015, 9 pages.

* cited by examiner

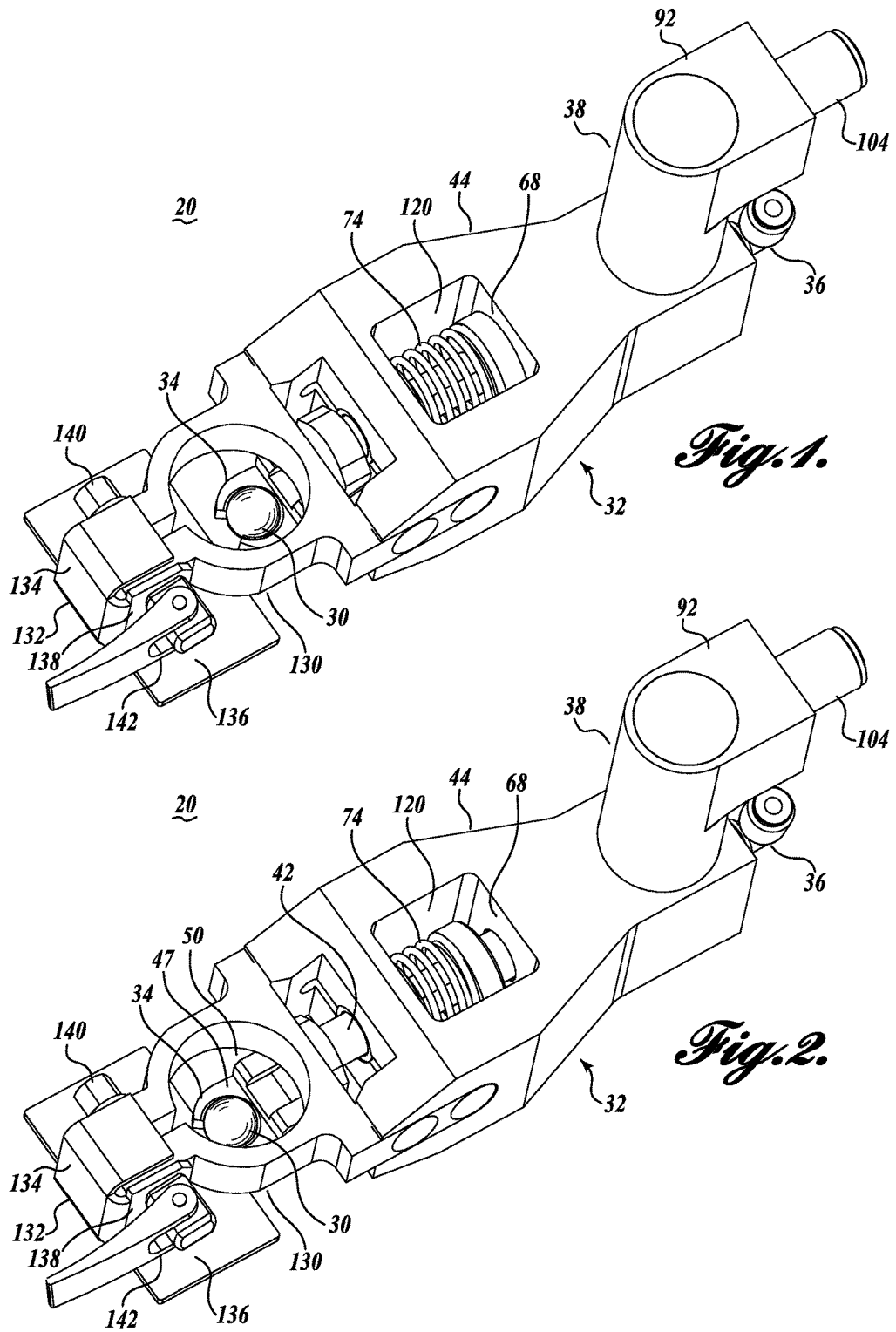

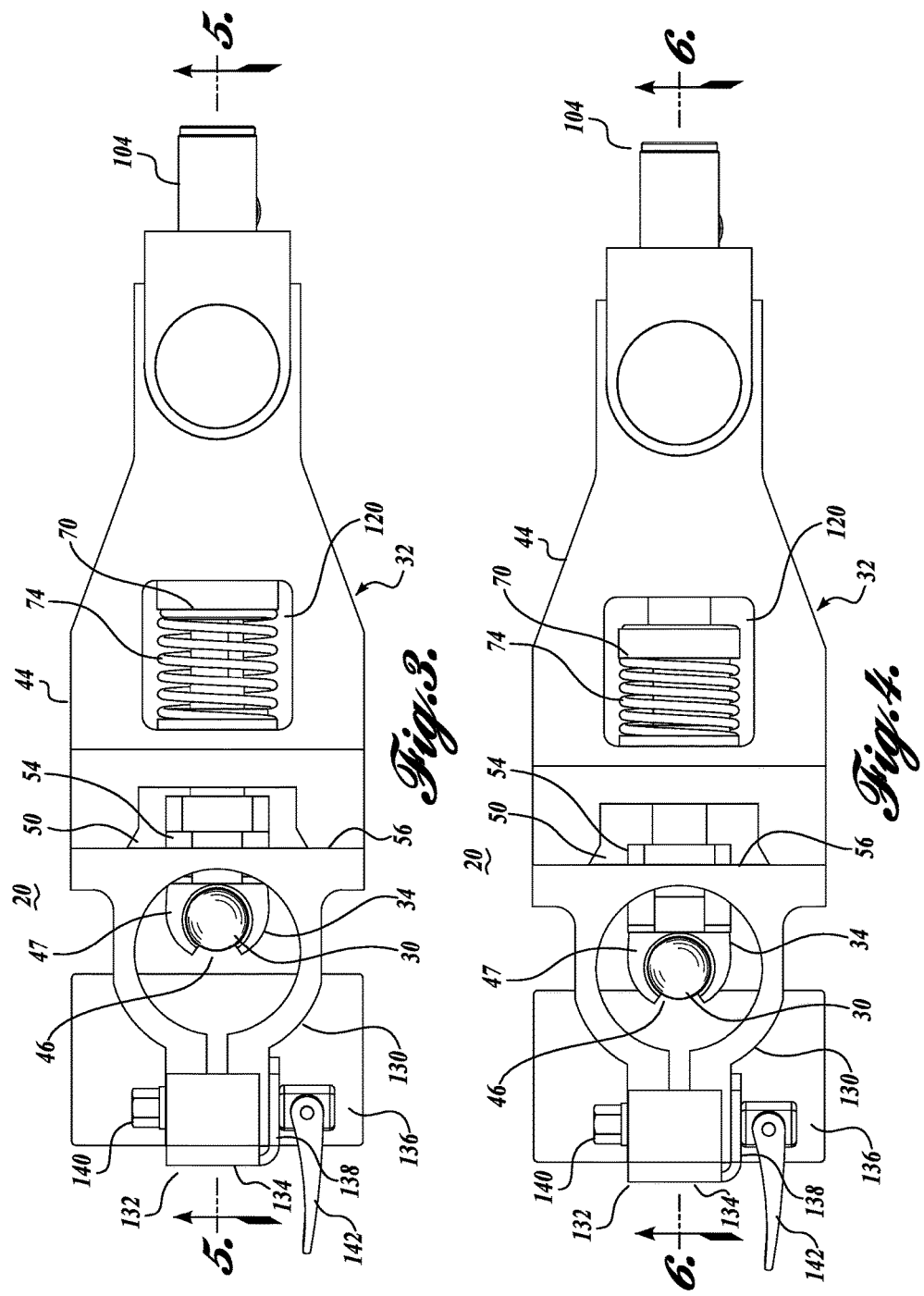

HIGH SPEED JET BLOCKER WITH READILY REPLACEABLE BLOCKING MATERIAL

CROSS-REFERENCES TO RELATED APPLICATIONS

This application is a division of U.S. application Ser. No. 14/590,903, filed Jan. 6, 2015, which claims the benefit of U.S. Provisional Application No. 61/924,631, filed Jan. 7, 2014, the disclosures of which are hereby incorporated by reference herein in their entirety.

FIELD OF THE INVENTION

This invention relates to the cutting of food and other soft materials utilizing a high-pressure fluid stream, and, more particularly, to methods and apparatus for interrupting or blocking the flow of the high-pressure fluid with high enough speed, consistency, and reliability to satisfy the requirements of modern high-speed industrial food processing lines.

BACKGROUND

The need to interrupt the high speed fluid jets widely used to cut food, paper and other products has been known for years. The fluids used to cut food products are generated with very high pressures, and do not use abrasives such as are used when cutting metals or stones. The high pressure allows the fluid to cut through the food products very quickly and in any direction. This ability has led to the development of cutter control and motion systems that also move very rapidly and in any direction.

In moving rapidly to cut the food products, it is advantageous at times to block the fluid to allow the path of the stream to cross over the food without cutting it. The jet stream may be blocked during a cutting procedure of an individual portion, or when an individual cutter crosses over a stream of products to reach a destination on the far side of the stream. Typically, the blocking of the jet stream has been achieved by inserting a metal pin into the stream, either with a pneumatic cylinder, or by pivoting the pin into the stream with an electric motor.

When modern food portioning machines draw intricate patterns at high speeds, the full block and unblock cycle needs to be completed in a matter of milliseconds. Crossing between the blocked and unblocked position must happen within a few milliseconds to draw sharp shapes and corners. Additionally, while a delay between sending the actuating signal and initial movement can be acceptable within the limits noted above, it must be very consistent—within a range of a few milliseconds.

Industrial food processes can only be viable if they are extremely efficient, with high production rates, and long runtimes with very low levels of scheduled and unscheduled downtime. The environment that jet blockers operate in is extremely hostile. The atmosphere is almost continuously wet and hot, and replete with organic debris from the food product being cut. The movement of the jet blocker causes high frequency shaking and vibrations with movements with accelerations up to 8 gs. Also, the pressure from the waterjets causes continuous erosion of machine parts, adding to downtime and high maintenance costs. Daily cleaning cycles include high-pressure washing and harsh chemicals that can be at either extreme of the pH scale. The desired life cycle for the blocker is in the area of 150 million cycles in this environment, with under a total of 1% scheduled and unscheduled downtime for the machine during the routine 16-hour-per-day operations.

The high-pressure waterjets can generate sound levels over 100 db, requiring that personnel working near the machine wear hearing protection. Sound levels are often reduced when cutting stones or metal by performing the cut under water; however, that option is not possible with food products. Other approaches to reducing the sound levels include disrupting the jet after it has cut through the product. It has been noted that the greater the length of the jet stream, the higher the sound levels, and so the closer to the nozzle the jet stream is disrupted, the greater the reduction in sound levels. Blocking the jet for cutting operations with jet blockers will also achieve sound reductions in the times they are blocking the jet stream.

Various methods and apparatus have been used to controllably interrupt a high-speed water jet. One such method of interruption is to use a linear actuator to insert an object between the high-speed water jet and the product to be cut. Typically, a pneumatic linear actuator forces a blocker pin into the path of the water jet to interrupt the flow of the cutting stream and a spring provides a retracting force for the plunger pin. Existing pneumatic blocker pin devices are capable of reaching closure times of 50-90 milliseconds and thereby limiting the speed at which products may be cut by the water jet.

The fluid jets the blockers must block are jet streams that can be as high as 87,000 psig in pressure. The high-pressure blocker mechanisms wear rapidly, not only with direct impingement from the fluid jet, but also from indirect sprays from higher pressure blocked water. Blocker pins therefore require frequent manual re-positioning of their surfaces to allow a new wear surface to be presented to the fluid jet. Pins may undergo several manual adjustments, and then must be replaced entirely—a process that may cause unwanted and expensive downtime, and if done improperly, reduce the service life of the device.

In another type of apparatus, actuators have been used that insert a blocking pin into the jet stream with rotating electric motors that move a pin into the stream with a rotating motion. These actuators may be sufficiently fast to meet the speed requirements, but have other shortcomings that limit their life, and contribute to unacceptable levels of downtime for routine maintenance.

The blocking pin is prone to relatively rapid wear. An adjustment mechanism allows moving the pin further in, or out, to present a new point on the pin to block the water. After 5 to 10 adjustments, the pin is removed from the blocker and turned end-for-end to allow another 5 to 10 adjustments. This requires a partial disassembly of the blocker mechanism. After both ends of the pin are worn through, the pin needs to be replaced entirely. When rotating or replacing the pin, the seals, gaskets and screws, etc., are often damaged, allowing water to enter the actuating mechanism, causing premature failure of the entire device.

In existing designs of jet blockers, the material that interrupts the fluid stream is much harder than the food being cut, but still will be eroded to the point of failure, and the time of failure is unpredictable. This unpredictable failure of the blocking function, as well as other parts prone to failure, can be a cause of expensive downtime to producers using the systems. Most pins are made of relatively expensive materials such as Stellite and carbide compounds, selected to last as long as possible, due to their resistance to wear. Long wear allows the longest time possible between the unpredictable failure events and manual replacement of the pins requiring mechanical replacement of the pins and subsequent downtime.

What is lacking in the art is a water jet blocker and method of use that will provide rapid movement, and precise control of the blocker while allowing predictable erosion, and easy replacement of the blocking material to prevent unscheduled downtime. The present invention seeks to address this need, and seeks to provide further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An apparatus for controlling the flow of a high-pressure stream of fluid usable for various purposes, including for cutting workpieces, includes a blocking member and a seat for receiving the blocking member. The seat is configured to enable the blocking member to change positions within the seat during operation of the apparatus. An actuator advances the blocking member into the high-pressure fluid stream to disrupt the flow of the high-pressure fluid stream. The actuator system also retracts the blocking member out of the high-pressure fluid stream to end the disruption of the flow of the high-pressure fluid stream. The blocking member is movable relative to the seat when struck by the high-pressure fluid stream to present a different portion of the blocking member to the high-pressure fluid stream.

In accordance with another aspect of the present disclosure, the blocking member is configured to be rotatable within the seat and the impingement from the high-pressure fluid stream on the blocking member causes rotation of the blocking member relative to the seat. As a consequence, a different portion of the blocking member is continuously presented to the high-pressure fluid stream.

In a further aspect of the present disclosure, the blocking member is spherical in shape and the seat is at least partially circular or partially spherical in shape. In accordance with another aspect of the present disclosure, the blocking member is in the form of a cylindrical exterior shape and the seat comprises spaced-apart sections defining a gap therebetween that is separated by a distance that is less than the length of the blocking member.

In a further aspect of the present disclosure, the actuator system includes a linear actuator to either advance the blocking member into the fluid stream and/or retract the blocking member out of the fluid stream. A return system acts on the blocking member to move the blocking member in opposition to the linear actuator. The return system can be in the form of a resilient element, for instance, a spring. Further, the actuator system can be powered by pressurized fluid.

In accordance with a further aspect of the present disclosure, a retainer can be utilized to prevent the blocking member from becoming removed from the seat, for example, while the high-pressure fluid is being disrupted by the blocking member.

In accordance with a further aspect of the present disclosure, the blocking member and seat can be configured and positioned to cause a stream of high-pressure fluid to force the blocking member against the seat during blocking of the high-pressure fluid stream by the blocking member.

In accordance with a further aspect of the present disclosure, a method is provided for blocking a high-pressure fluid stream emitted from a nozzle. The method includes placing the blocking member in a seat and shape to receive the blocking member and permit the blocking member to rotate or otherwise shift in position relative to the seat.

The method also includes moving the blocking member into and out of a path of the high-pressure stream wherein a retaining member prevents the blocking member from becoming removed from the seat while permitting the blocking member to move within the seat due to the force of the high-pressure stream on the blocking member thereby to present different portions of the blocking member to the high-pressure stream.

In accordance with a further aspect of the present disclosure, the method for blocking the high-pressure fluid stream, when the blocking member is placeable onto the seat in the direction of flow of the high-pressure stream, with the blocking member nominally being held within the seat by the weight of the blocking member.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a pictorial view of the blocking apparatus in accordance with the present disclosure illustrating a blocking ball in retracted position;

FIG. 2 is a view similar to FIG. 1, but with the blocking ball in extended position;

FIG. 3 is a plan view of FIG. 1;

FIG. 4 is a plan view of FIG. 2;

DETAILED DESCRIPTION

Figure 5:
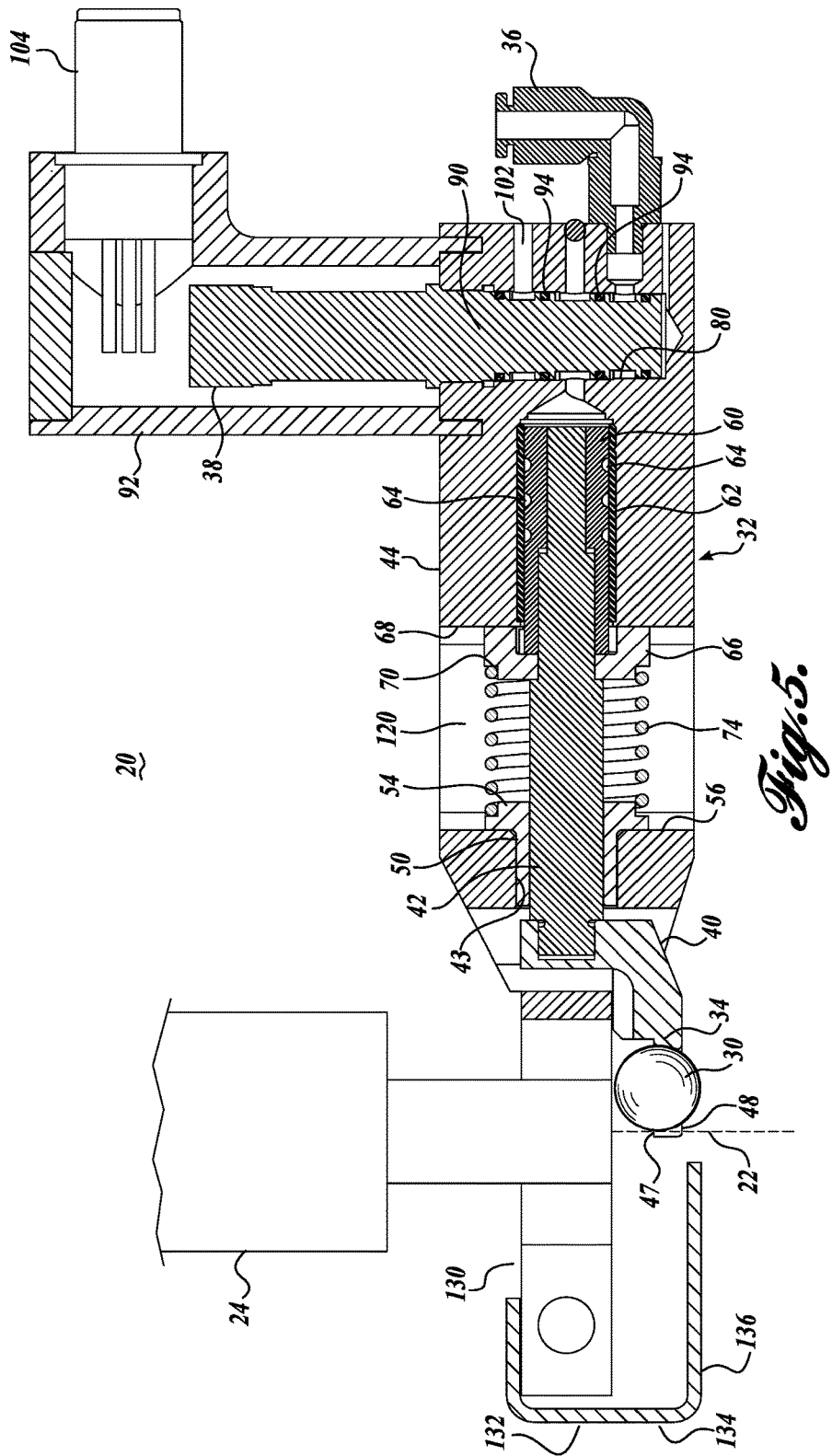
FIG. 5 is an elevational cross-sectional view of FIG. 1.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to "forward," "rearward," "upward," "downward," "extended," "advanced," and "retracted." These references are only to assist in helping describe and understand the present invention and are not intended to limit the present invention to these directions. Also, references to "work product," "workpiece," "food product," and "food piece" are understood to be interchangeable and are not meant to be limiting in nature.

In the following description, various embodiments of the present disclosure are described. In the following description and in the accompanying drawings, the corresponding components and parts are identified by the same part number, but with an alpha suffix. The descriptions of such parts/components are not repeated so as to avoid redundancy in the present application.

Referring initially to FIGS. 1-6, an apparatus 20 for controlling the flow of high-pressure fluid stream 22 emitted from a nozzle 24, includes a blocker or blocking member 30 which is advanced into the fluid stream 22 to block or otherwise disrupt the fluid stream, and/or retracted from the fluid stream by an actuator 32. FIGS. 1-6 show one example of a blocker member 30 in the form of a sphere or ball supported in an underlying seat 34 shaped and sized to correspond to the size and shape of the blocker sphere 30. The actuator 32 is operated by pressurized fluid directed to the actuator 32 by a connector or fitting 36. A solenoid valve 38 controls the operation of the actuator 32 to advance the blocker member 30 into the high-pressure stream 32 and/or retract the blocker member 30 from out of the path of the fluid stream 22.

The blocker sphere/ball 30 is disposed within the seat 34 formed in the forward end of a carrier 40 having a rearward upright section fixedly attached to the forward end of a piston rod 42, which in turn is disposed within a longitudinal bore 43 formed longitudinally within the body 44 of the actuator 32. The seat 34 does not entirely encircle the blocker ball 30 but is open in the direction away from the piston rod 42 ("forward" direction) to define a gap 46. As such, when the blocker ball 30 is advanced into the stream 22 of high-pressure fluid, or retracted from the high-pressure fluid stream, the stream does not directly impinge on the seat 34 but instead contacts the peripheral of the blocker ball 30 tending to cause the blocker ball to rotate within the seat 34.

Figure 6:
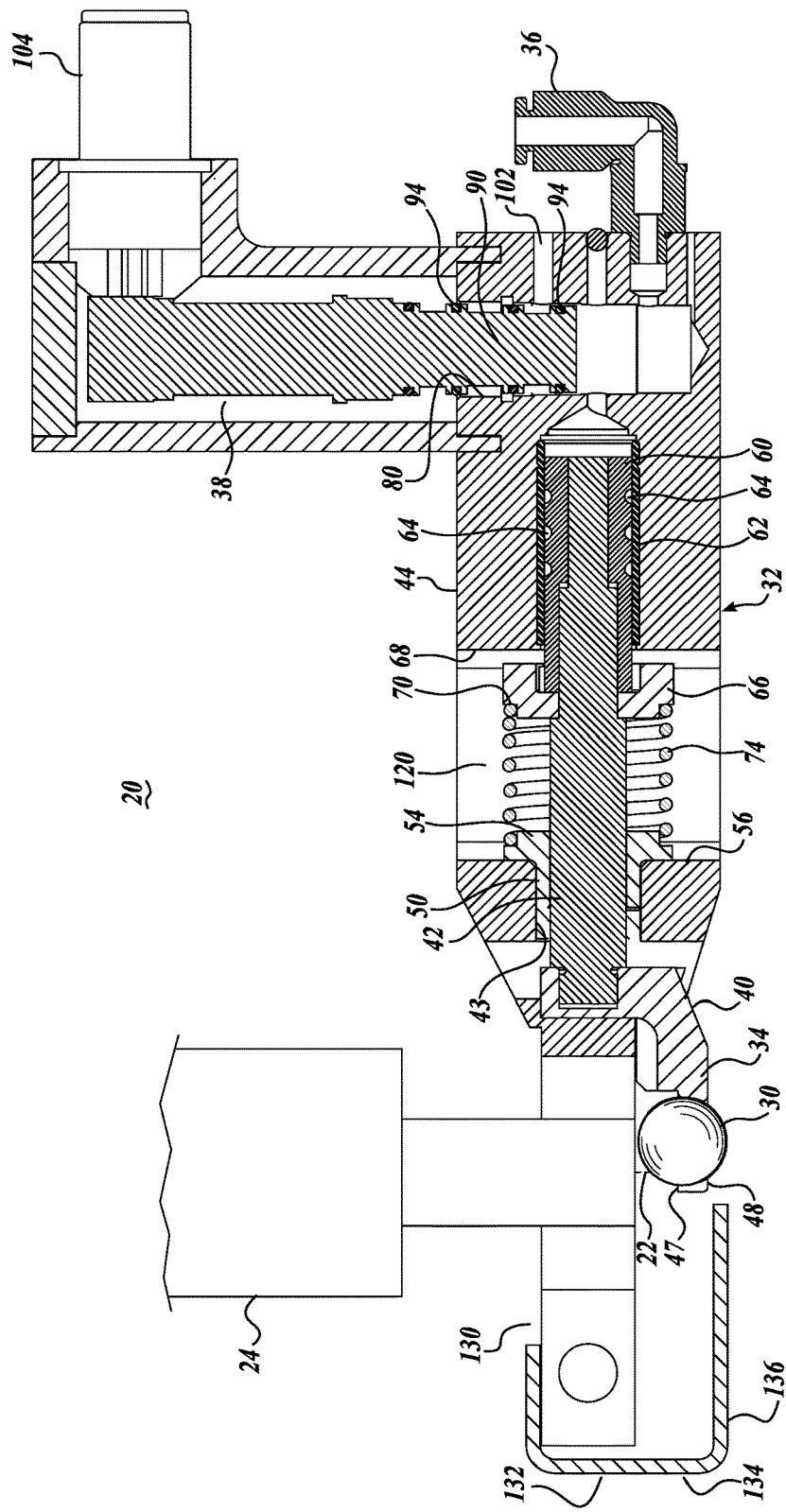
FIG. 6 is an elevational cross-sectional view of FIG. 2.

As shown in FIGS. 5 and 6, the surface of the seat 34 contacting the blocker ball 30 is curved and shaped to correspond to the shape of the blocker ball. As a consequence, the blocker ball 30 closely fits within the seat 34 and is able to readily rotate relative to the seat 34. It will be appreciated that the top edge 47 of the seat 34 corresponds to approximately the maximum diameter of the blocker ball 30, whereas the bottom edge 48 of the seat 34 has a diameter that is less than the maximum diameter of the blocker ball, thereby to retain the blocker ball within the seat 34. It is to be appreciated that the seat 34 can be of other configurations or orientations than as shown in FIGS. 1-6. For example, the seat can be composed of a split ring (not shown), with the ring being circular in cross-section.

Referring specifically to FIGS. 5 and 6, the forward end of the piston rod 42 is carried by a bushing 50 engaged within the forward end of the longitudinal bore 43 formed in the actuator body 44. The bushing 50 has a forward pilot portion which snugly engages within the actuator body bore 43 and a larger diameter flange section 54 that bears against the adjacent face 56 of the body 44. The rear end of the piston rod 42 is engaged with the interior of a piston 60 which is slidably disposed within the close-fitting longitudinal bore 43 formed in the actuator body 44. A labyrinth-type seal 62 is disposed between the exterior of the piston 60 and the bore 43 of the body 44. The seal 62 provides actual clearance for the length of the piston 60 while also minimizing leakage past the piston due to the turbulence created by the leakage air moving into and out of annular grooves 64 formed in the exterior of the piston 60.

The forward end of the piston 60 bears against the central portion of a washer-shaped spring seat 66. A counter bore is formed in the rear side of the spring seat for reception of the forward end of the piston 60. The opposite side of the spring seat bears against a shoulder formed in the piston rod 42. In this manner, the spring seat is held captive between the piston and the piston rod. The outer diameter portion of the spring seat 66 nominally bears against the adjacent face 68 of housing body 44. A recessed shoulder 70 is formed on the opposite side of the spring seat 66 from the counter bore for receiving the adjacent rear end portion of a compression spring 74. As shown in FIG. 5, the compression spring 74 nominally positions the blocking ball 30 in retracted position.

The rear end of the bore 43 may be placed in fluid flow communication with a transverse bore 80 formed in housing 44 which is occupied by the spool portion 90 of solenoid valve 38 disposed within a surrounding housing 92. A series of seals 94 extend around spool section 90 to form a fluid-tight seal with transverse bore 80. As shown in FIGS. 5 and 6, the solenoid valve 38 extends and retracts spool section 90. When the spool section 90 is in retracted, upward position, as shown in FIG. 6, the piston 60 is in fluid flow communication with a source of pressurized fluid entering the lower end of transverse bore 80 via elbow fitting 36. However, when the spool section 90 is in the extended, downward position, as shown in FIG. 5, the source of pressurized fluid entering transverse bore 80 via fitting 36 is closed off by the spool section. Also, when the spool section is in the position shown in FIG. 5, the outlet end of the bore 43 is in fluid flow communication with an exhaust port 102, which permits the piston 60 to assume a retracted position under the influence of compression spring 74.

The pressurized fluid which enters transverse bore 80 and then the longitudinal bore 58 may consist of pressurized air, hydraulic fluid, water, or other types of fluids. The solenoid valve 38 is actuated by an electrical power source, not shown, which may be connected to the apparatus 20 by use of electrical connector 104 carried by housing 92. Of course, other types of actuators may be used to control the movement of spool 90.

It will be appreciated that, by the above construction of the transverse bore 80 in the housing 44 at the rear end of the actuator body bore 43, a very compact construction is achieved for the blocker apparatus 20. As a result, a very small volume of air in a short length of air column or other pressurized fluid need be used to drive the piston 60 forwardly. As a consequence, the cycle times achieved for the blocker apparatus 20 can be very short. In a typical situation, a solenoid valve would be located remotely from the actuator, with a fluid line or hose extending between the valve and the actuator. However, such configuration can result in response times that is quite slow due to the fluid friction within the overall system, the connecting hose acting as a reservoir, and flow restrictions involving end fittings. The apparatus of the present disclosure addresses this situation by integrating the solenoid 38 and spool 90 directly into the housing 44 of the piston 60 and piston rod 42 Referring additionally to FIGS. 1-4, a vertical through aperture 120 is formed in actuator body 44 at the location corresponding to spring 74. This aperture facilitates the assembly of spring seat 66, flange 54, and spring 74 over piston rod 42. Also, the spring and corresponding components are accessible for inspection, cleaning and sanitizing. Further, the entire apparatus 20 is lighter in weight.

As shown in FIGS. 1-6, a clamp 130 projects forwardly from the forward end of the actuator body 44 to define circular aperture through which the lower end of nozzle 24 extends so that the bottom of the nozzle is slightly above the top surface of the blocking ball 30. The bottom of the nozzle 24 is close enough to the upper surface of the blocking ball 30 to prevent the blocking ball from "jumping out" of seat 34.

The forward end of the clamp 130 supports a deflector bracket 132 formed with the central right-angle-shaped hanger portion 134 leading down to a horizontal deflector plate portion 136 that is approximately the same width as the actuator body 44 and extends rearwardly to almost touch the blocker ball 30 when the blocker ball is extended into blocking position, as shown in FIG. 6. The deflector plate portion 136 prevents the fluid stream deflecting off the blocker ball to extend downwardly toward the work product being cut by the fluid stream. Absent the use of the deflector plate portion 136, the deflected fluid stream could reach the work product and thus cause the work product to move relative to the nozzle 24, thereby resulting in inaccurate cuts made in the work product. The deflector bracket 132 also includes side panels 138 that overlap the exterior of the forward ends of clamp 130. A through opening is formed in the side panels 138 as well as in the arms of the clamp 130 for reception of hardware members (bolt 140 and a quick-release nut 142 which can be of the type commonly used to attach a bicycle wheel axle to the bicycle frame) to attach the deflector bracket 132 to the clamp. The bolt 140 and nut 142 are also used to attach the apparatus 20 to the nozzle 24. It will be appreciated that by the foregoing construction, the deflector bracket 132 can be easily replaced by simply removing the hardware members used to attach the deflector bracket from the clamp 130 without the need for any tools. This can be important, since the deflector plate will be eroded by the jet stream 22.

To use the apparatus 20, a blocker ball 30 is simply lowered onto the seat 34, wherein the apparatus is ready for use. When desiring to block the fluid stream 22 emanating from nozzle 24, the actuator 32 is extended by use of pressurized fluid entering the actuator via fitting 36. With the solenoid valve 38 in retracted position, pressurized fluid reaches the rear end of piston 60 to drive the piston rod 42 forwardly thereby to position the blocker ball 30 within the path of the high-pressure jet stream 22. As the blocker ball 30 first contacts the jet stream 22, the force imposed on the blocker ball by the jet stream causes the blocker ball to rotate within seat 34 or otherwise move relative to the seat, for example, lift off of or relative to the seat 34. In this manner, different portions of the blocker ball surface are exposed to the stream 22 during use of the apparatus 20. The blocker ball does not rotate or otherwise move about a constant or fixed axis when rotated by the high pressure fluid stream. As a consequence, the entire surface area of the block ball is available to serve to disrupt the flow of the stream 22. Also, it will be appreciated that by forming the seat in different shapes or curvature or by tilting the seat side-to-side or by other modifications to the seat, the ball can be caused to rotate in a specific or designed manner that helps to expose the entire, or a substantial portion, of the area of the ball to the fluid stream 22.

It may be that in some uses and environments, the blocker ball 30 may tend to become stuck in its seat 34. Even if that does occur, it is expected that the blocker ball will be functional for at least one or more shifts so that the ball can be replaced without resulting in any down time of the apparatus 20. To facilitate the movement of the ball in the seat 34, a lifter or ramp can be utilized beneath the ball so that when the ball is retracted, it is lifted or raised up off of the seat 34. Correspondingly, when the seat and ball 34 are moved forwardly into the stream 22, the ball falls back into the seat 34 with some inevitable relative movement between the ball and seat. The lifter or ramp can be carried by the clamp 130, actuator body 44 or otherwise.

The blocker ball need only be extended onto the stream 22 so that the ball is impinged at about 45 degrees from the vertical. At this position, the spray from the stream is redirected primarily away from the actuator 32 and sideways from the blocker apparatus 20. Also, only extending the actuator to this location requires less time to travel from unblocked to blocked position (and reverse) than if the ball were extended so that the stream strikes the top of the ball. In addition, striking the ball with a glancing blow redirects the energy stream 22, as opposed to completely breaking the stream and absorbing all of its energy, as would be the case when blocking against the top of the ball.

It will be appreciated that when the blocker ball 30 is in the path of the high-pressure jet stream 22, the bottom of the nozzle 24 is just slightly above the top of the ball surface thereby preventing the ball from jumping out of or otherwise leaving the seat 34. Thus, the nozzle 24 serves as a retainer for retaining the ball 30 within the seat 34.

To retract the blocker ball from the stream 22, the solenoid valve 38 is extended to block off communication between the pressurized fluid and the piston 60. In this regard, the spool 90 is in the downward position as shown in FIG. 5. When in such position, the bore 43 in which the piston 60 is engaged is in fluid flow communication with outlet port 102 thereby to exhaust the pressurized fluid out through the outlet port. Also, during this same portion of the blocker apparatus operational cycle, compression spring 74 presses against spring seat 66 to drive the piston and piston rod to retracted position, shown in FIG. 5, so that the blocker ball 30 is retracted out of the path 22 of the high-pressure jet stream.

It will be appreciated that with every cycle of the blocker apparatus 20, the blocker ball 30 is free to rotate on or otherwise move relative to its seat 34. Even though different portions of the exterior surface of the seat are exposed to the jet stream 22, eventually the high-pressure jet stream causes erosion of the exterior surface of the blocker ball. At a predetermined interval, for instance, at the end of every production day, or other time period, the blocker ball 30 may be easily replaced by simply loosening the bolt 140 and lifting the blocker ball off of the seat 34 without the need of any tools or disassembly of the blocker apparatus 20. The quick release nut 142, such as used to attach a bicycle wheel axle to the bicycle frame, can be used for tightening and loosening the bolt 140 by hand, thereby not requiring any tools. This results in a substantial savings of labor relative to replacing the blocking element in existing high-speed water jet blockers in use. Also, standard ball bearings may be used as the blocker ball. Such ball bearings can be composed of standard grades of steel, such as 304 or 316. Also, the ball bearings can be of various sizes, for example, from about ¼ inch to about 1 inch in diameter. Moreover, replacing the blocker ball during scheduled maintenance periods avoids unscheduled interruptions during production periods, which can be quite costly due to decreased productivity.

When the blocker ball 30 is in line with the high-speed water jet stream 22, the deflector plate portion 136 prevents a large proportion of the water or other cutting fluid used from reaching the work products being cut by the jet stream. Such work products may be food products. As a consequence, there is less likelihood that the work product will be shifted or moved by impingement by the high-pressure stream deflected off of the blocker ball.

Apparatus 20 has been described in a manner that actuator 32 is shifted into extended position for the blocker ball 30 to block the high-pressure liquid stream 22. Correspondingly, the blocker ball is retracted from the stream 22 by the action of compression spring 74. However, it will be appreciated that the roles of the actuator 32 and spring 74 may be reversed so that the blocker ball is nominally placed within the path of the stream 22 by the action of the spring 74. In this configuration, to retract the blocker ball out of the path of the stream 22, actuator 32 acts to compress the spring 74. Whether this alternative mode of operation of the blocker apparatus 20 is preferred over the mode of operation described above may depend on what proportion of the time the blocker ball is used to block the stream 22.

As a further possibility, a double-acting actuator may be used in place of actuator 32 whereby pressurized fluid is used to both extend and retract the seat carrier 40. In this situation, a compression spring for either return or extension of the piston rod would not be utilized. While this configuration may increase the cost of the blocker apparatus 20, it also potentially can result in the increased performance of the apparatus by reducing the required minimum cycle time of the blocker apparatus 20.

Also, it can be appreciated that by selectively sizing the diameter of piston 60, and by selectively sizing the spring 74, and/or by other changes or adjustments to the apparatus 20, the apparatus 20 can be configured so that the speed or time required for the blocker ball 30 to be extended into the path of the stream 22 can closely match the time required for the blocker ball to be retracted from the stream 22. Alternatively, it may be desirable that the speed of extending the blocker ball be faster or slower than the speed of retracting the blocker ball 30. In this regard, the components of the present blocker apparatus 20 can be designed and configured to accommodate the desired relative speed of the extension and retraction of the blocker ball 30.

Figure 7:
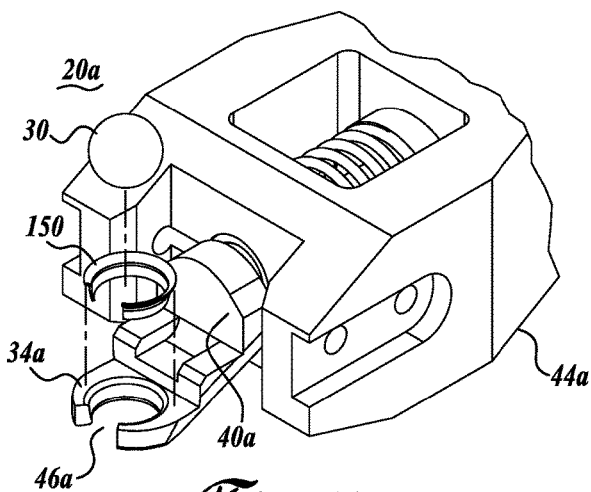
FIG. 7 is a pictorial view of a further embodiment of the present disclosure.

A further embodiment of a blocker apparatus 20a in accordance with the present disclosure is shown in FIG. 7. An insert 150 is utilized between the seat 34a and the blocker ball 30. The interior of the insert is shaped to correspond to the shape of the blocker ball, and the exterior of the insert is shaped to correspond to the shape of the seat 34a. Also, as in the seat 34a, the insert 150 is constructed with a gap that matches the gap 46a of seat 34a. Other than with the exception of the insert 150, the blocker apparatus 20a can be substantially similar in construction and operation as apparatus 20, described above.

The insert may be composed of material, such as bronze, which provides low friction with the blocker ball. Moreover, insert 150 can simply be lifted off of the seat 34 to be replaced. This can occur at the same time that the blocker ball 30 is replaced. As a consequence, the seat carrier 40a need not be replaced with any frequency, which would require more time and effort than simply replacing the insert 150.

Figure 9:
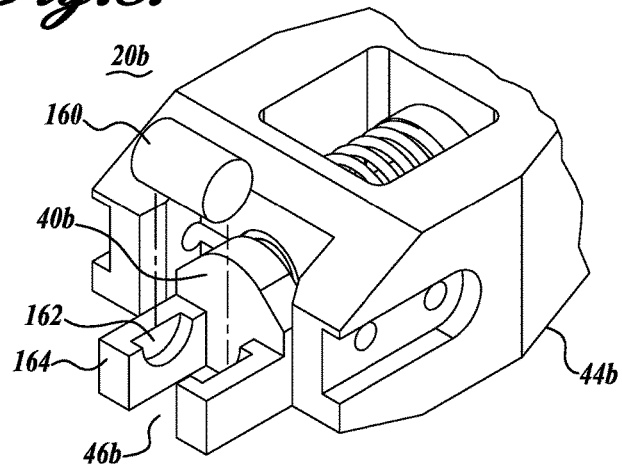
FIG. 9 is a pictorial view of a further embodiment of the present disclosure.

A further embodiment of a blocker apparatus 20b in accordance with the present disclosure is illustrated in FIG. 9, wherein the spherical blocker ball 30 is replaced by a blocker rod or cylinder 160. The blocker rod 160 is downwardly receivable within generally semi-circularly-shaped seats 162 formed in parallel arms 164 that project forwardly from carrier 40b. The seats 162 are shaped to closely receive the blocker rod 160 and permit the blocker rod to rotate within the seats, especially when the blocker rod 160 is moved into, and out of, the path 22 of the high-pressure water jet.

As in FIGS. 1-6, the blocker rod 160 is very easily replaced by simply lifting the blocker rod 160 upwardly from seats 162 and inserting a new blocker rod into the seats. Moreover, as in seat 34, the arms 164 define a gap 46b therebetween so that the water jet does not impinge directly against the arms 164 during use of the blocking apparatus. Also, as in FIG. 7, inserts can be utilized in conjunction with seats 162 so as to avoid wear of the carrier seat 40b.

Rods 160 can be composed of the same or similar materials used to construct the blocker balls 30. Also, as non-limiting examples, the blocker rods/cylinders can be from about ⅛ inch to 1 inch in diameter, and can be of a length of about ½ inch to 2 inches.

The seats 162 can be of different length along the length of the rod 160. As such, the rod can be flipped end-to-end to thereby present a different portion of the rod to the water jet stream 22.

Figure 8:
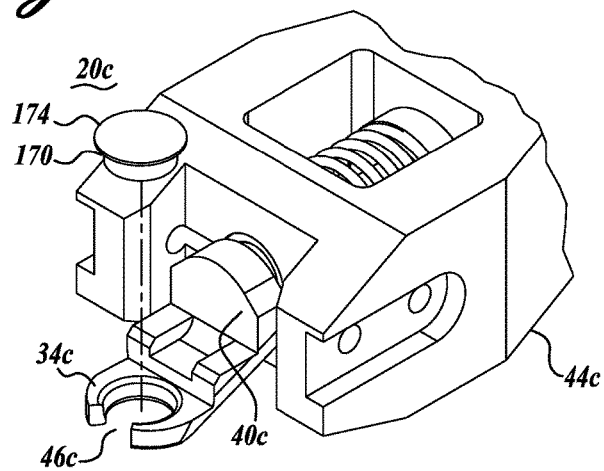
FIG. 8 is a pictorial view of a further embodiment of the present disclosure.

A further embodiment of a blocker apparatus 20c of the present disclosure is shown in FIG. 8, wherein essentially the blocker ball 30 of FIGS. 1-6 is replaced by a circular insert 170. For receiving insert 170, the seat 34c can have a vertical wall to partially surround the insert 170. Also, the insert may have an upper rim 174 to overlie the top of the seat surface, thereby to vertically retain the insert 170 within the seat 34c. Although not essential, the insert 170 may rotate about its vertical central axis when the blocker apparatus 20c is in use. Further, as in the prior embodiments of the present disclosure, the insert 170 can be easily replaced by simply lifting the insert off of seat 34c and then replacing the removed insert with a new insert, by simply dropping the new insert into the seat 34c.

It will be appreciated that other configurations of blockers, in addition to spherical blocker 30, blocker rod 160, and insert 170, may be utilized in conjunction with the present disclosure. In each of these situations, the blocker element is easily replaced without the need for any special tools or disassembly of the blocking apparatus.

While the preferred embodiment of the invention has been illustrated and described, it will be appreciated that various changes can be made therein without departing from the spirit and scope of the invention. As one example, it is noted that in the above description in the "default" position, the blocking member, where the ball 30, rod 160 or insert 170, is retracted from the fluid stream 22. The reason for this is that the time that the water jet is blocked is typically minimized so as to minimize the wear on the blocker member. However, with the blocking apparatus 20 of the present disclosure, it is possible to operate the apparatus in "default" position wherein the water jet 22 is being blocked by the blocking member 30. In other words, the water jet 22 would be blocked other than when the water jet is being used in a cutting a work product. This is possible because of the long wear life of the blocking member and the ease with which the blocking member may be replaced and the low cost of the blocking member.

Employing the blocked position as the "default" position of the blocker apparatus 20 leads to a significant reduction in the overall noise generated by the water jet stream 22. As discussed above, the greater the length of the jet stream, the higher the noise level generated. Thus, if the jet stream is blocked close to the nozzle in default condition, for a greater portion of the time, the water jet may be blocked rather than unblocked, as currently the situation in existing water jet cutters.

It may be that if the cutting apparatus is on standby mode so that the water jet is emitted from the nozzle 24 but cutting is not occurring, the blocker could be exposed to the jet stream at the same location on the blocker. In this situation, if the blocker is not rotating in its seat, a single point on the blocker would be impinged by the jet stream. If this occurs, it is possible to move the blocker occasionally, for instance, by operation of the actuator 32, thereby to "jostle" the blocker and expose a new area of the blocker to the jet stream 22. This would "spread the wear" about the area of the blocker.

As a further alternative, the seat for the blocking member can be of other configurations than described above. For example, rather than using a seat 34 that is shaped to correspond with a portion of the spherical shape of the blocker ball 30, the seat can be composed of perhaps three or four contact points at the underside of the ball on which the ball nominally rests. Such contact points can consist of the tips of curved spikes or spokes that emanate from a central hub to extend upwardly from the hub. In such configuration, the nominal friction force between the ball and the seat would be minimal. A similar arrangement can be utilized if the blocker member is in the form of rod 160. In such situation, perhaps two sets of contact points each composed of two points laterally spaced apart at a distance less than the diameter of the blocker rod, can be used to support the blocker rod. Again, friction levels between the blocker rod 160 and the underlying contact points would be minimal. Of course, a greater or smaller number of contact points can be used to serve as the seat for blocker ball 30 or blocker rod 160.

Also, although the solenoid valve 38 is described and illustrated above as incorporated into, or as part of, actuator 32, the actuator could be paired with a remotely located solenoid valve. In that situation, a fluid line or hose or tube could extend between the valve and the actuator. In this configuration, the solenoid valve can be at a location away from the high-pressure liquid stream 22 emitted by nozzle 24. As noted above, remotely locating solenoid valve may result in slower cycle times for the blocking apparatus 20. For some cutting purposes, a reduced cycle time may be acceptable.

Other than being formed on carrier 40 described above, the seat for the blocker 30, similar to seat 34, can be incorporated into a different carrier structure. As one example, a carrier seat similar to seat 34 can be formed on the distal end of a pivot bar of the type disclosed in U.S. Pat. Nos. 5,927,320 and 5,931,178, both incorporated by reference herein. In these two patents, a pivot bar is pivoted horizontally intermediate its ends by a pivot arm engaging one end of the pivot bar, the pivot arm is in turn pivoted back and forth by a rotary actuator. A seat similar to seat 34 can be incorporated into the distal end of the pivot bar, opposite the pivot arm, to carry a blockable member similar to ball 30 described above. The blocker ball can be moved into and out of a high pressure fluid stream by the pivoting motion of the pivot bar. Further, a seat similar to seat 34 can be incorporated into other types of water jet blockers in addition to the blockers disclosed in U.S. Pat. Nos. 5,927,320 and 5,931,178.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus for deflecting the flow of a high-pressure stream of fluid, comprising:
   a. a spherically shaped blocking member;
   b. a seat that is at least partially circular in shape for receiving and supporting the spherically shaped blocking member, the seat configured to enable the blocking member to change position within the seat during operation of the apparatus;
   c. an actuator system connected to the seat for advancing the blocking member into the high-pressure fluid stream to disrupt and deflect the flow of the high-pressure fluid stream and/or for retracting the blocking member out of the high-pressure fluid stream to end the disruption and deflection of the flow of the high-pressure fluid stream;
   d. wherein the blocking member is movable relative to the seat when struck by the high-pressure fluid stream to present a different portion of the blocking member to the high-pressure fluid stream; and
   e. wherein the seat at least partially surrounds and supports the underside of the spherically-shaped blocking member, whereby the spherically-shaped blocking member is positioned on the seat by setting the spherically-shaped blocking member downwardly onto the seat, whereby the underside of the blocking member is supported by the seat.

2. The apparatus of claim 1, wherein:
the blocking member is rotatable on the seat; and
impingement of the high-pressure fluid stream on the blocking member causes rotation of the blocking member relative to the seat to present a different portion of the blocking member to the high-pressure fluid stream.

3. The apparatus of claim 1, wherein the actuator system advances the seat and spherical blocking member into the high-pressure fluid stream in a direction laterally to the flow path of the high-pressure fluid stream.

4. The apparatus of claim 1, wherein the at least partially circular seat comprises spaced-apart sections defining a gap therebetween that is separated by a distance that is less than the length of the blocking member.

5. The apparatus of claim 1, wherein the actuator system comprises:
   a linear actuator to either advance the seat together with the blocking member into the fluid stream to deflect the fluid stream and/or to retract the seat together with the blocking member out of the fluid stream.

6. The apparatus of claim 5, further comprising a return system acting on the seat to move the blocking member in opposition to the actuator system.

7. The apparatus of claim 6, wherein the return system is activated by a resilient element.

8. The apparatus of claim 1, wherein the actuator system is powered by a pressurized fluid.

9. The apparatus of claim 1, wherein the actuator system comprises:
   a. a piston operably connected to the seat of the blocking member;
   b. a source of pressurized fluid; and c. a valve for selectively directing the pressurized fluid to the piston to either advance the seat and blocking member into the high-pressure fluid stream or retract the seat and the blocking member from the high-pressure fluid stream.

10. An apparatus for deflecting the flow of a stream of high-pressure fluid used for cutting, the apparatus comprising:
    a. a spherically shaped blocking member;
    b. a seat that is at least partially circular in shape to correspond to the shape of the spherically shaped blocking member and to receive and support the blocking member and permit the blocking member to shift relative to the seat under the influence of flow of the stream of high-pressure fluid;
    c. an actuator system connected to the seat for moving the blocking member into the stream of high-pressure fluid to disrupt and deflect the flow of the high-pressure fluid stream and for moving the blocking member out of the stream of high-pressure fluid to not disrupt and deflect the flow of the high-pressure fluid stream;
    d. a retainer for preventing the blocking member from becoming removed from the seat while the high-pressure fluid stream is being disrupted and deflected by the blocking member; and
    e. wherein the seat at least partially surrounds and supports the underside of the spherically shaped blocking member, whereby the spherically shaped blocking member is positioned on the seat by setting the spherically shaped blocking member downwardly onto the seat, whereby the underside of the blocking member is supported by the seat.

11. The apparatus of claim 10, wherein the actuator system is controlled to position the blocking member into the stream of high pressure fluid as the default operational position of the apparatus.

12. The apparatus of claim 10, wherein the blocking member is positioned to deflect the stream of high-pressure fluid other than when the stream of high-pressure fluid is being used for cutting.

13. The apparatus of claim 10, wherein the blocking member and corresponding seat are configured and positioned to cause the stream of high-pressure fluid to force the blocking member against the seat during deflection of the high-pressure fluid stream by the blocking member.

14. The apparatus of claim 10, wherein the actuator system moves the seat and the spherically shaped blocking member into and out of the stream of high-pressure fluid in a direction laterally to the direction of flow of the high-pressure fluid stream.

15. The apparatus of claim 10, wherein the actuator system comprises:
    a linear actuator to either advance the blocking member into the high-pressure fluid stream and/or to retract the blocking member out of the high-pressure fluid stream; and
    a return system capable of acting on the blocking member in opposition to the linear actuator.

16. The apparatus of claim 15, further comprising a valve for controlling the operation of the linear actuator, the valve integrated into the structure of the linear actuator.

17. The apparatus of claim 15, wherein the return system is powered by a resilient element.

18. A method for deflecting a high-pressure fluid stream emitted from a nozzle, comprising:
    a. placing a spherically shaped blocking member into a seat that is shaped to receive the blocking member and permit the blocking member to rotate or otherwise shift in position relative to the seat, with the blocking member nominally held within the seat by the weight of the blocking member;
    b. moving the blocking member into and out of the path of the high-pressure fluid stream to deflect the flow of the high-pressure fluid stream; and
    c. preventing the blocking member from becoming removed from the seat while permitting the blocking member to move within the seat due to force of the high-pressure fluid stream on the blocking member, thereby to present different portions of the blocking member to the high-pressure fluid stream.

19. The method according to claim 18, preventing the blocking member from becoming removed from the seat by a retaining member that is carried by the nozzle.

20. The method according to claim 18, further comprising:
    a. moving the blocking member relative to the path of the high-pressure stream with a linear actuator; and
    b. controlling the operation of the linear actuator with a valve integrated into the structure of the linear actuator.

* * * * *